S. S. SCHINDLER.
Piano-Stool.
No. 162,105.
Patented April 13, 1875.
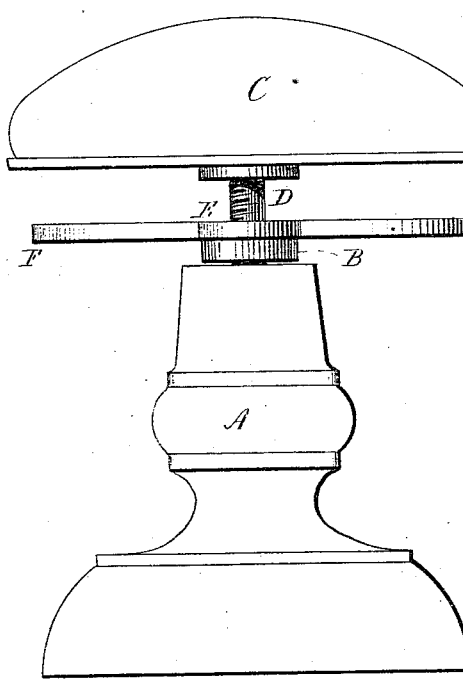
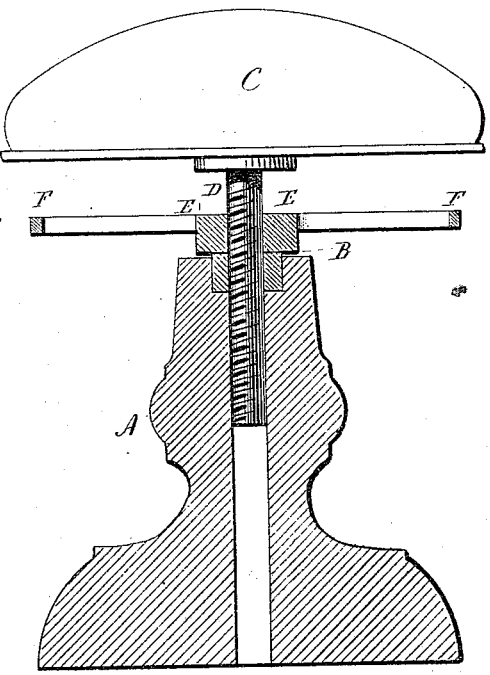
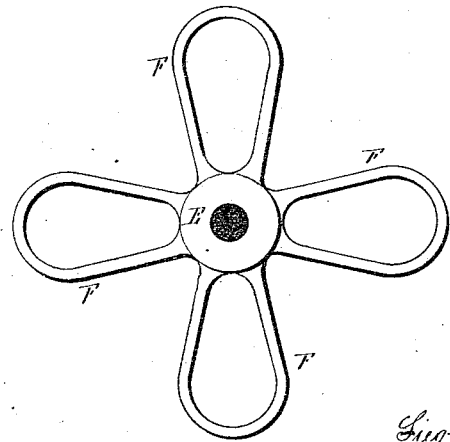

UNITED STATES PATENT OFFICE.

SIEGFRIED S. SCHINDLER, OF WEST MERIDEN, CONNECTICUT.

IMPROVEMENT IN PIANO-STOOLS.

Specification forming part of Letters Patent No. 162,105, dated April 13, 1875; application filed December 16, 1874.

*To all whom it may concern:*

Be it known that I, SIEGFRIED S. SCHINDLER, of West Meriden, in the county of New Haven and State of Connecticut, have invented a new Piano-Stool; and I do hereby declare the following, when taken in connection with the accompanying drawings and the letters of reference marked thereon, to be a full, clear, and exact description of the same, and which said drawings constitute part of this specification, and represent, in—

Figure 1, side view; Fig. 2, vertical section; Fig. 3, transverse section, looking down.

This invention relates to an improvement in that class of stools which are made adjustable, as to elevation, by means of a central screw, attached to the under side of the seat, working in a nut in the center post, such as are commonly called piano-stools. In this class of stools the whole support comes upon the nut, and as the screw must work freely in the nut, there always will be more or less play of the screw in the nut. This makes the seat very unsteady, and liable to be turned by everything which comes in contact with it, so that a readjustment is required.

The object of this invention is to overcome these difficulties; and it consists in placing upon the screw an auxiliary nut, provided with radial projections, by which the said nut may be easily turned down upon the top of the pillar or principal nut, to bind the screw, as more fully hereinafter described.

A is the pillar or center post, in which the nut B is screwed; C, the seat, provided with the central screw D, to work in the nut B in the usual manner. For this class of stools E is the auxiliary nut, corresponding to the thread of the screw D, and constructed with radial projections F, more or less in number. This nut E is placed upon the screw, and the screw then run into the principal nut, taking care always to keep the nut E above or free from bearing on the top of the pillar or nut. When the desired elevation is attained, then turn the nut E, by means of the radial projections F, hard down upon the top of the pillar or nut. This binds the screw so as to make the seat as firm as if not adjustable, and it cannot be easily turned, so long as it is so bound by the nut E; but by loosing the nut E the seat may be adjusted and the nut E reset.

By this construction the existing difficulties in adjustable seats are overcome, and the stool preserves all the advantages of a rigid seat, together with all of an adjustable seat, without the disadvantages of either.

I claim—

The combination of the seat C, center screw D, principal nut B, and auxiliary nut E, provided with radial projection F, substantially as and for the purpose specified.

S. S. SCHINDLER.

Witnesses:
CHARLES H. SHAW,
A. A. FRENCH.